United States Patent [19]

Nagashima et al.

[11] Patent Number: 6,124,390

[45] Date of Patent: Sep. 26, 2000

[54] AROMATIC POLYSULFONE AND GROUP IA OR IIA METAL OXIDE OR CARBONATE

[75] Inventors: Tohru Nagashima; Hideo Nomura, both of Ibaraki, Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/600,177

[22] Filed: Feb. 12, 1996

[30] Foreign Application Priority Data

Feb. 16, 1995 [JP] Japan .................................... 7-028296

[51] Int. Cl.$^7$ .............................. C08K 3/22; C08K 3/26; C08L 81/06

[52] U.S. Cl. ......................... 524/433; 524/425; 524/430; 524/609

[58] Field of Search .................... 524/425, 430, 524/433, 609

[56] References Cited

U.S. PATENT DOCUMENTS

| | | | |
|---|---|---|---|
| 4,015,039 | 3/1977 | Segal et al. .............................. | 524/430 |
| 4,356,282 | 10/1982 | Largman .................................. | 524/413 |
| 4,743,645 | 5/1988 | Harris et al. ............................. | 524/456 |
| 4,843,113 | 6/1989 | Tatsukami et al. ...................... | 524/425 |
| 5,268,409 | 12/1993 | Asia et al. ............................... | 524/424 |
| 5,488,084 | 1/1996 | Kadoi et al. ............................. | 524/425 |

FOREIGN PATENT DOCUMENTS

| | | |
|---|---|---|
| 0283914 | 9/1988 | European Pat. Off. . |
| 0380303 | 8/1990 | European Pat. Off. . |
| 0418719 | 3/1991 | European Pat. Off. . |
| 3843438 | 6/1990 | Germany . |
| 4-83258 | 3/1992 | Japan . |

OTHER PUBLICATIONS

Derwent Publications, Ltd., London, GB; AN 91–299730 (JP–A–03 199 265, Aug. 30, 1991, Abstract).

Derwent Publications, Ltd., London, GB; AN 91–321680 (JP–A–03 215 560, Sep. 20, 1991, Abstract).

*Primary Examiner*—Robert E. L. Sellers
*Attorney, Agent, or Firm*—Birch, Stewart, Kolasch & Birch, LLP

[57] ABSTRACT

An aromatic polysulfone resin composition contains 100 parts by weight of an aromatic polysulfone resin and 0.001–50 parts by weight of at least one compound selected from oxides, peroxides, double oxides and carbonates of a metal belonging to the Group IA or IIA in the periodic table of elements and having a water absorption of 2% or less.

15 Claims, No Drawings

AROMATIC POLYSULFONE AND GROUP IA OR IIA METAL OXIDE OR CARBONATE

BACKGROUND OF THE INVENTION

1. Field of the Invention

The present invention relates to an aromatic polysufone resin composition which exhibits an extremely decreased rate of corrosive gas generation from molded products thereof and which is suitable for electric and electronic parts.

2. Background Information

Aromatic polysulfone resins are materials suitable for electronic parts for which a high dimensional stability and a high heat resistance are required, based on the fact that these resins are amorphous and hence are isotropic and have a small mold shrinkage factor, and have a higher glass transition temperature than other high heat resistance resins, such as polyphenylene sulfides or polyether ketones. Thus, aromatic polysulfone resins maintain their properties, such as mechanical strength, elasticity and creep resistance, at a less lowered level up to a higher temperature as compared with said other resins. Particularly, a material in which an aromatic polysulfone resin is compounded with fibrous materials such as glass fibers exhibits a decreased mold shrinkage factor and improved strength and elasticity and therefore may be applied, for example, to relays, switches, connectors, sockets, coil bobbins and so on.

Since aromatic polysulfone resins have a relatively high melt viscosity, they need a higher molding temperature, injection pressure and molding speed, when they are used for injection molding of electronic parts having a small size and a complicated shape or electronic parts having a thin thickness region. Due to such factors, decomposition gas may be generated by heat during molding and a part of the gas may become occluded in molded products. Said occluded gas may be released from the molded products upon practical use and may create various problems. In particular, when the electronic part is a relay.(or case, base, armature, coil bobbin and the like) and the occluded gas is a corrosive gas, a problem may be created in that metal contacts become corroded to cause insulation failure even if the released amount of occluded gas is very small.

The fact that the gas generated from molded products mainly composed of an aromatic polysulfone resin contains corrosive $SO_2$ has been confirmed by gas chromatography, mass spectrography and so on. While $SO_2$ is a gas derived from the aromatic polysulfone resin and it is supposed that the gas is formed by heat decomposition in the course of molding and occluded in the molded products, the details of the mechanism causing its production are still unclear.

On the other hand, as a means for decreasing gas generation, JP-A-60-186561 discloses that generation of corrosive gases such as $SO_2$ gas and $H_2S$ gas which may be formed by decomposition of polyphenylene sulfide (PPS) can be decreased by adding a hydrotalcite to the PPS resin. Further, JP-A-62-167356 and JP-A-62-295956 disclose that the formation of corrosive gases can also be decreased by adding zeolites to the PPS resin. In addition, JP-A-2-194056 discloses that generation of corrosive gases and aliphatic hydrocarbons with lower boiling points can be decreased when hydrotalcite or zeolites are added to a resin mainly composed of an aromatic polysulfone resin. Additionally, JP-A-3-199265 discloses that formation of corrosive gases can be reduced by adding magnesium oxide to a polyether sulfone resin. Still, JP-A-3-215560 discloses that formation of corrosive gases can be reduced by adding magnesium carbonate to a polyether sulfone resin.

However, while an effect is obtained in decreasing $SO_2$ at a specific adding amount when hydrotalcite or zeolites are mixed to an aromatic polysulfone resin in order to decrease the amount of $SO_2$ gas generated from the aromatic polysulfone resin composition, granulation becomes difficult due to deterioration in winding of the resin mixture around a screw of an extruder for producing a composition or in taking up of strands and thus inconveniences may occur in practical use.

The present invention has the purpose to provide an aromatic polysulfone resin composition which has an extremely decreased rate of corrosive gas generation from molded products thereof, which retains mechanical strength and heat resistance inherent in aromatic polysulfone resin, which is excellent in granulation and molding properties and which is suitable for electric and electronic parts.

As the results of extensive studies conducted to solve the above problems, the present inventors have found that the above purpose can be attained by adding a specific amount of at least one compound selected from oxides, peroxides, double oxides and carbonates of a metal belonging to the Group IA or IIA in the periodic table of elements to an aromatic polysulfone resin.

SUMMARY OF THE INVENTION

Accordingly, the present invention relates to an aromatic polysulfone resin composition comprising 100 parts by weight of an aromatic polysulfone resin and 0.001–50 parts by weight of at least one compound, added to said resin, selected from oxides, peroxides, double oxides and carbonates of a metal belonging to the Group IA or IIA in the periodic table of elements.

DETAILED DESCRIPTION OF THE INVENTION

The aromatic polysulfone resin is defined as polyarylene compounds in which three of an arylene unit, an ether bond and a sulfone bond are essential constitutional units and in which the arylene units are disorderly or orderly arranged together with ether and sulfone bonds. Typical examples include, without limitation, those having the following repeating units.

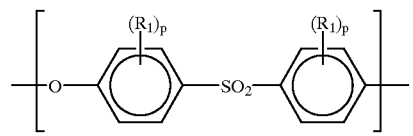

(I)

-continued

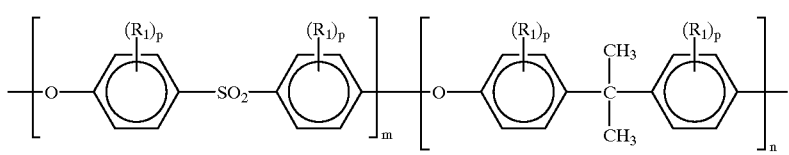
(II)

wherein the compound (II) includes random copolymers; $R_1$ represents an alkyl group of 1 to 6 carbon atoms, an alkenyl group of 3 to 10 carbon atoms, a phenyl group or a halogen atom; p is an integer of 0 to 4; m and n indicate average number of repeating units and are positive numbers of 0.1–100; $R_1$'s on the same or different nuclei may be different with one another; and p's may be different with one another.

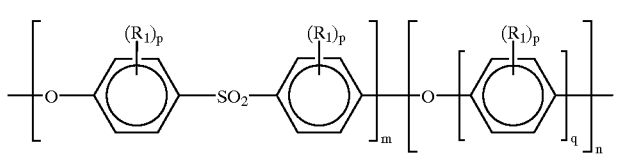
(III)

wherein the compound includes random copolymers; $R_1$ represents an alkyl group of 1 to 6 carbon atoms, an alkenyl group of 3 to 10 carbon atoms, a phenyl group or a halogen atom; p is an integer of 0 to 4; q, m and n indicate average number of repeating units and q is a positive number of 1–3, and m and n are positive numbers of 0.1–100; $R^1$'s on the same or different nuclei may be different with one another; and p's may be different with one another.

It is preferred that, in the aromatic polysulfone resin used in the present invention, m/(m +n) in the structural unit in (II) is 0.8 or more; and it is preferred that m/(m+n) in the structural unit (III) is 0.8 or more and q is 1.

Among the resin, the preferred one has repeating structural units (I) and (II). Examples include SUMIKAEXCEL PES 3600P, 4100P and 4800P (trade names), manufactured by Sumitomo Chemical Co., Ltd., having (I), and UDEL P-1700 (trade name), manufactured by AMOCO, having (II). Among them, aromatic polysulfones having a repeating structural unit (I) are particularly preferred.

The terminal structure of the aromatic polysulfone resins used in the present invention depends on the process for producing each resin and include, without limitation, Cl, OH, OR (wherein R is an alkyl group) and the like.

Said at least one compound selected from oxides, peroxides, double oxides and carbonates of a metal belonging to the Group IA or IIA in the periodic table of elements has a water absorption of 2% or less, preferably 1.5% or less and more preferably 1% or less. The compound can be used after decreasing the water absorption by means of dehydrating by heating, reduction of pressure and the like. The compound having a water absorption more than 2% is not preferred because granulating properties are deteriorated by use of such compound.

The term water absorption refers to a rate of loss in weight of a sample when said sample is heated from the room temperature to 400° C. at a rate of 10° C. per minute using a thermogravimetric analysis apparatus.

The metal oxides and peroxides of a metal belonging to Group IA or Group IIA used in the present invention are represented by the general formulae: $M_2O$, $M'O$ or $M'_2$ (in these formulae, M is a Group IA metal element, M' is a Group IIA metal element). Particularly, M is preferably selected from Na and K, and M' is preferably selected from Mg, Ca and Ba. Examples include, without limitation, calcium oxide (99.9%), Magnesium oxide (heavy, special reagent grade), Barium oxide (chemical reagent), Barium peroxide (wako first class reagent grade) available from Wako Pure Chemical Industries, Ltd., Micromag 3-30 (trade name) available from Kyowa Chemical Industry Co., Ltd. and the like.

The double oxides containing a metal belonging to Group IA or Group IIA used in the present invention are represented by the general formulae: $M_2O \cdot mM''O_2 \cdot xH_2O$, $M''O \cdot mM''O_2 \cdot xH_2O$, $M_2O \cdot pM'''_2O_3 \cdot mM''O_2 \cdot xH_2O$ or $M_2O \cdot pM'O \cdot mM'''_2O_3 \cdot nM''O_2 \cdot xH_2O$ (in these formulae, M is a Group IA metal element, M' is a Group IIA metal element, M'' is a tetravalent metal element, M''' is a trivalent metal element, p, m and n are positive numbers of 1 or more and x is a positive number of 0 or more). Particularly, M is preferably K, and M' is preferably selected from Mg, Ca and Ba. Examples include, without limitation, wollastonite, attapulgite, sericite, mica, potassium titanate, barium titanate and the like.

The carbonates containing a metal belonging to Group IA or Group IIA used in the present invention are represented by the general formulae: $M_2CO_3$, $M'CO_3$ or $M' \cdot M''(CO_3)_2$ (in these formulae, M is a Group IA metal element, M' and M'' are Group IIA metal elements). Particularly, M is preferably K, and M' and M'' are preferably selected from Mg, Ca and Ba. Examples include, without limitation, potassium carbonate, calcium carbonate, dolomite and the like.

The amount of at least one compound selected from oxides, peroxides, double oxides and carbonates of a metal belonging to the Group IA or IIA in the periodic table of elements, used in the present invention, to be added is 0.001–50 parts by weight and preferably 0.005–30 parts by weight based on 100 parts by weight of the aromatic polysulfone resin. When the amount of the compound is less than 0.001 part by weight, almost no effect is obtained for decreasing corrosive gases generated from the molded products. To the contrary, when more than 50 parts by weight of the compound is added, the effect does not increase proportionally for decreasing corrosive gases generated from the molded products but difficulties in granulation occur that the mechanical properties of the molded products are lowered and, winding of resin mixture to the extruder is deteriorated and extruded strands are not taken up smoothly.

The average particle size of at least one compound selected from oxides, peroxides, double oxides and carbonates of a metal belonging to the Group IA or IIA in the periodic table of elements, used in the present invention, is 0.01–100 pm and preferably 0.1–50 pm. The average particle size of less than 0.01 pmis not preferred because the compound aggregates during granulation of the composition. Also, the average particle size of more than 100 μm is not preferred because the surface area per unit weight is lowered and thus effect of decreasing corrosive gases becomes insufficient.

Further, in the present invention, it is possible to add one or more materials selected from fibrous or needle-like reinforcing material such as glass fiber, silica-alumina fiber, alumina fiber, carbon fiber, aluminum borate whisker or the like, inorganic filler such as talc, mica, clay, glass bead or the like, release promoter such as fluorine resin, metal soap or the like, coloring agent such as dye, pigment or the like, and usual additive such as antioxidant, heat stabilizer, ultraviolet light absorber, antistatic agent, surfactant or the like, as necessary.

Also, it is possible to add one, two or more resins selected from a small amount of a thermoplastic resin, for example, polyamide, polyester, polyphenylene sulfide, polyether ketone, polycarbonate, polyphenylene ether and its modification product, polyether imide or the like, and a small amount of a thermosetting resin, for example, phenol resin, epoxy resin, polyimide resin or the like.

There is no limitation in means for compounding raw materials in order to produce the resin composition of the resent invention. The compounding is generally effected by mixing an aromatic polysulfone; at least one and possibly more compound selected from oxides, peroxides, double oxides and carbonates of a metal belonging to Group IA or IIA in the periodic table of elements and having a water absorption of 2% or less and, as necessary, a reinforcing material such as glass fibers or the like, inorganic fillers, a releasing promoter, a heat stabilizer and the like using a Henschel mixer, tumbler or the like, and then melt-kneading using an extruder. The melt-kneading may be conducted by mixing all the raw materials in one batch and feeding to an extruder or, if necessary, by feeding raw materials such as glass fibers and inorganic fillers separately from raw materials mainly composed of a resin.

The product molded using the aromatic resin composition of the present invention may be heat-treated in order to further decrease the amount of corrosive gases. Conditions for such heat-treatment are not particularly limited.

Since the aromatic polysulfone resin composition of the present invention has a decreased relative amount of corrosive gas generated from molded products, retains mechanical strength and heat resistance inherent in aromatic polysulfone resin and is excellent in granulation and molding properties, it is very useful as a resin for electric and electronic parts.

EXAMPLES

The present invention will now be illustrated with Examples, which should not be construed as a limitation upon the present invention. In the Examples, determination of corrosive gases released from the molded product, measurement of various properties and comparison of granulation properties were carried out according to the following methods.

(1) The amount of the corrosive gas ($SO_2$) released from molded products:

The aromatic polysulfone resin composition of the present invention was molded into a plate of 64 mm in length, 64 mm in width and 1 mm in thickness using an injection molding machine (manufactured by Nissei Plastics Co.,Ltd., trade name PS40E5ASE) at a cylinder temperature of 360° C.–370° C. and a mold temperature of 150° C. The obtained molded product was cut into chips of 5 mm in length, 5 mm in width and 1 mm in thickness. After washing with water, the chip was placed in a 20 ml vial dried with hot air and combined with 5 ml of deionized water. The vial was sealed with a polytetrafluoroethylene packing material and the content therein was stirred at 80° C. for 20 hours to extract $SO_4^{2-}$. The extract water was cooled and a predetermined amount of it was charged into an ion-chromatogram (type 4510i manufactured by DIONEX; column: AG4A+AS4A+ AMMS; eluate: 1.8 mM $Na_2CO_3$, 0.9 mM $NaHCO_3$; flow rate: 1.5 ml/min.) in order to detect $SO_4^{2-}$ and the amount of $SO_4^{2-}$ per weight of the chip was calculated. Since it was known that the corrosive gas $SO_2$ supposed to be occluded in the molded product was completely oxidized to $SO_4^{2-}$ under the above extracting conditions, that a larger amount of $SO_4^{2-}$ was extracted from the molded product means that a larger amount of the corrosive gas was released.

(2) Tensile strength and Deflection temperature under load

An ASTM No.4 dumbbell and a test piece of 127 mm in length, 12.7 mm in width and 6.4 mm in thickness were molded from the aromatic polysulfone resin composition of the present invention at a cylinder temperature of 360–370° C. and a mold temperature of 150° C. and subjected to measurement according to ASTM D638 and ASTM D648, respectively.

(3) Comparison of granulating properties

Granules from the aromatic polysulfone resin of the present invention and granules from that of Comparative Example 1, prepared by methods shown in Example and Comparative Example, respectively, were compared in respect of feeding property to twin-screw extruder and taking-up property of the extruded strands and the results are shown with a score and criteria: ○, equivalent; Δ, slightly inferior; ×, clearly inferior.

Examples 1–9 and Comparative Example 1–5

Aromatic polysulfone resin powders (manufactured by Sumitomo Chemical Co., Ltd., trade name Sumika Excel PES 3600P) and a compound such as an oxide of a metal belonging to Group IA or IIA in the periodic table of elements having a water absorption of 2% or less in a composition shown in Table 1 were mixed with a Henschel mixer and granulated using a twin-screw extruder (manufactured by Ikegai Iron Works, PCM-30) at a cylinder temperature of 340° C. to give an aromatic polysulfone resin composition. Similarly, an aromatic polysulfone resin composition without containing metal compound (Comparative Example 1) was prepared.

The granulation properties were evaluated according to the above methods when the resin compositions were granulated. In addition, The resin compositions were molded by injection according to the above method and the molded products were assayed for the amount of $SO_4^{2-}$ in the molded products, tensile strength and deflection temperature under load of the molded products. The results are shown in Table 1.

TABLE 1

Formulation of Resin Compositions

| | Aromatic Polysulfone (Parts by weight) | Additive Kind | Water Absoption (%) | Amount (Parts by Wt.) | Amount SO$_4^{2-}$ (ppm) | Tensile Strength (kg/cm$^2$) | Deflection Temp. by Load °C. | Granulation |
|---|---|---|---|---|---|---|---|---|
| Example 1 | 100 | Calcium oxide | 0.8 | 0.02 | 0.6 | 880 | 208 | ○ |
| Example 2 | 100 | Calcium oxide | 0.8 | 5 | 0.4 | 860 | 207 | ○ |
| Example 3 | 100 | Calcium oxide | 0.8 | 40 | 0.3 | 850 | 205 | ○ |
| Example 4 | 100 | Magnesium oxide | 1.2 | 0.02 | 1.0 | 880 | 208 | ○ |
| Example 5 | 100 | Magnesium oxide | 1.2 | 5 | 0.6 | 880 | 207 | ○ |
| Example 6 | 100 | Barium oxide | 0.2 | 0.03 | 0.5 | 880 | 208 | ○ |
| Example 7 | 100 | Barium peroxide | 0.2 | 0.03 | 0.5 | 880 | 208 | ○ |
| Example 8 | 100 | Wollastonite | 0.7 | 0.2 | 0.9 | 870 | 206 | ○ |
| Example 9 | 100 | Dolomite | 0.4 | 0.2 | 1.1 | 870 | 206 | ○ |
| Comp. Ex. 1 | 100 | — | — | — | 7.0 | 880 | 208 | ○ |
| Comp. Ex 21 | 100 | Calcium oxide | 0.8 | 0.0005 | 6.9 | 880 | 208 | ○ |
| Comp. Ex. 3 | 100 | Calcium oxide | 0.8 | 60 | 0.3 | 650 | 203 | X |
| Comp. Ex. 4 | 100 | Calcium oxide | 2.9 | 5 | 0.8 | 880 | 207 | Δ |
| Comp. Ex. 5 | 100 | Magnesium oxide | 3.7 | 5 | 0.9 | 860 | 207 | Δ |

It can be clearly seen that the aromatic polysufone resin compositions containing at least one compound selected from oxides, peroxides, double oxides and carbonates of a metal belonging to Group IA or IIA in the periodic table of elements and having a water absorption of 2% or less (Examples 1–9), according to the present invention, had extremely small content of SO$_4^{2-}$ in the molded product when compared with the aromatic polysulfone resin composition containing no such compound (Comparative Example 1). In other words, in the former, SO$_2$ gas released from the molded product was clearly decreased.

On the other hand, in the composition in which the content of the compound was smaller than 0.001 part by weight (Comparative Example 2), the effect of decreasing SO$_4^{2-}$ in the molded product was little. In the composition in which the content exceeded 50 parts by weight (Comparative Example 3), while the effect of decreasing SO$_4^{2-}$ in the molded product was comparable to that in the composition in which the content was 40 parts by weight (Example 3), the tensile strength lowered and the granulation properties were significantly inferior.

Further, the aromatic polysufone resin compositions containing at least one compound selected from oxides, peroxides, double oxides and carbonates of a metal belonging to Group IA or IIA in the periodic table of elements and having a water absorption more than 2% (Comparative Examples 4 and 5), had lesser effect of decreasing SO$_4^{2-}$ and granulation properties when compared with the aromatic polysulfone resin composition containing the compound having a water absorption of 2% or less (Examples 1–9).

What is claimed is:

1. An aromatic polysulfone resin composition comprising 100 parts by weight of an aromatic polysulfone resin and 0.02–40 parts by weight of calcium oxide having a water absorption of 1.5% or less as determined by a method wherein water absorption is a rate of loss in weight of a sample when said sample is heated from the room temperature to 400° C. at a rate of 10° C. per minute using a thermogravimetric analysis apparatus.

2. An aromatic polysulfone resin composition according to claim 1, wherein the amount of the calcium oxide is 0.005–30 parts by weight based on 100 parts by weight of the aromatic polysulfone resin.

3. An aromatic polysulfone resin composition according to claim 1, wherein the average particle size of the calcium oxide is 0.01–100 μm.

4. An aromatic polysulfone resin composition according to claim 1, wherein the aromatic polysulfone resin is selected from the group consisting of resins having at least one of the following repeating units (I), (II) or (III):

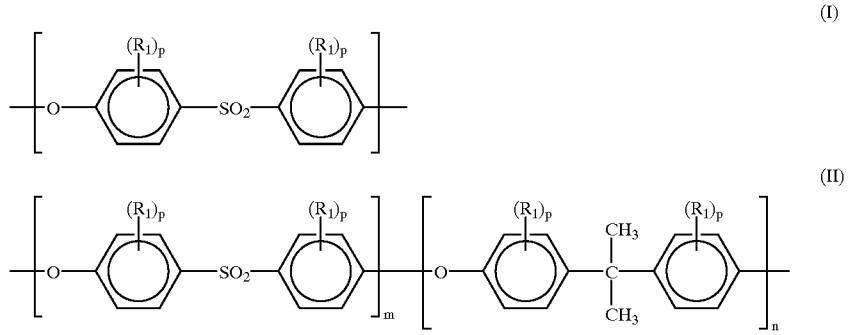

wherein each $R_1$ substituent independently represents an alkyl group of 1 to 6 carbon atoms, an alkenyl group of 3 or 10 carbon atoms, a phenyl group or a halogen atom; each p independently represents an integer of 0 to 4; and m and n each indicate an average number of repeating units and are positive numbers of 0.1–100; and

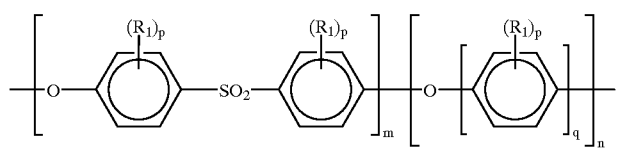

wherein each $R_1$ substituent independently represents an alkyl group of 1 to 6 carbon atoms, an alkenyl group of 3 to 10 carbon atoms, a phenyl group or a halogen atom; each p independently represents an integer of 0 to 4; and q, m and n each indicate an average number of repeating units, with q being a positive number of 1–3, and m and n being positive numbers of 0.1–100.

5. An aromatic polysulfone resin composition according to claim 4, wherein the aromatic polysulfone resin is a random copolymer having a repeating unit of formula (II) or (III).

6. An aromatic polysulfone resin composition according to claim 4, wherein m/(m+n) in the unit of formula (II) is 0.8 or more.

7. An aromatic polysulfone resin composition according to claim 4, wherein m/(m+n) in the unit of formula (III) is 0.8 or more and q is one.

8. An aromatic polysulfone resin composition according to claim 4, wherein the aromatic polysulfone resin has repeating units of formulas (I) and (II).

9. An aromatic polysulfone resin composition according to claim 1, wherein the water absorption of the calcium oxide is 1% or less.

10. An aromatic polysulfone resin composition according to claim 1, wherein the average particle size of the calcium oxide is 0.1–50 μm.

11. An aromatic polysulfone resin composition consisting essentially of 100 parts by weight of an aromatic polysulfone resin and 0.001–50 parts by weight of calcium oxide having a water absorption of 2% or less as determined by a method wherein water absorption is a rate of loss in weight of a sample when said sample is heated from the room temperature to 400° C. at a rate of 10° C. per minute using a thermogravimetric analysis apparatus.

12. An aromatic polysulfone resin composition according to claim 1, wherein the calcium oxide has a water absorption of 0.4–1.2%.

13. An aromatic polysulfone resin composition according to claim 11, wherein the calcium oxide has a water absorption of 0.4–1.2% and is present in the composition in an amount of 0.02–40 parts by weight.

14. An aromatic polysulfone resin composition according to claim 4, wherein the calcium oxide has a water absorption of 0.4–1.2%.

15. An aromatic polysulfone resin composition according to claim 10, wherein the calcium oxide has a water absorption of 0.4–1.2%.

* * * * *